United States Patent
Boyd

[11] 3,893,662
[45] July 8, 1975

[54] SHEET FEEDING DEVICE
[75] Inventor: Kenneth M. Boyd, Ross-on-Wye, England
[73] Assignee: Rank Xerox, Ltd., London, England
[22] Filed: Dec. 11, 1973
[21] Appl. No.: 423,830

[52] U.S. Cl. .................... 271/10; 226/17; 271/226; 271/273
[51] Int. Cl. .................................................. B65h 9/00
[58] Field of Search ........ 271/4, 10, 225, 226, 230, 271/243, 272, 273, 274, 229, 228, 227; 226/17, 34, 15; 198/262

[56] References Cited
UNITED STATES PATENTS
| | | | |
|---|---|---|---|
| 1,919,291 | 7/1933 | Coolidge | 226/17 X |
| 2,947,057 | 8/1960 | Meagher et al. | 226/17 X |
| 3,603,446 | 9/1971 | Maxey et al. | 198/262 |
| 3,697,063 | 10/1972 | Greenfield et al. | 271/4 |

Primary Examiner—Richard A. Schacher
Assistant Examiner—Bruce H. Stoner, Jr.

[57] ABSTRACT

A document feeding apparatus for sequentially feeding single documents from a stack to a stationary scanning platen of a copy reproduction machine. The apparatus includes an urging roller to advance the bottom document of the stack into separating rollers which prevent multiple sheets from being fed to the platen of the reproduction machine. Two pair of skew correction rollers are provided between the separating rolls and the platen to correct skew that may be introduced by the nudging and separating rollers to assure accurate positioning of the sheet on the platen of the machine.

4 Claims, 5 Drawing Figures

3,893,662

SHEET FEEDING DEVICE

BACKGROUND OF THE INVENTION

The development of high speed electrostatic reproduction machines has brought about the need for a simple, yet reliable accessory for sequentially changing the documents on the platen of the machine where the documents to be copied are optically scanned. In electrostatic machines such as the xerographic type disclosed in U.S. Pat. No. 3,674,363 to Bayler et al., the documents to be reproduced are placed in an automatic document handler which sequentially feeds the document to the platen of the machine. After exposure, the device removes the copied document and feeds the succeeding document to the platen for copying. Dependable apparatus for carying out this function of replacing documents on the scanning platen constitutes convenience to an operator who would otherwise have to manually change the documents and, at the same time, increases the efficiency of the electrostatic reproduction machine by permitting more copies to be made at a given time.

Generally speaking, sheet feeding devices for transporting sheet-form documents singly from a stack to a work station are known in the art. However, known sheet feeding devices are inadequate for dependably keeping pace with the great speed at which electrostatic machines now operate. When devices for singly advancing sheets from a stack are designed to operate at higher speeds, the chance for misfeeds and/or double feeds are generally increased. Thus dependable feeding of single sheets becomes a compromise between reliability and speed. Furthermore, when the requirements of a system dictate that single sheets from a stack of sheets be advanced without moving the other shheets in the stack and when the rapidly advancing sheet be stopped at a specific location at a work station, the demands of the feeder are more complex. When employing a sheet feeding device for the instant functions, it is extremely important that only a single document be fed at a time, that the document be fed in a rapid fashion, that the document to be reproduced be held stationary on the platen during exposure, and that the document placed on the platen is perfectly aligned to prevent the copied material from being placed in a skewed orientation on the copy sheet.

To accomplish the aforementioned functions, a plurality of rolls may be employed, i.e., a separater roll to initially separate a single sheet from the stack, retard means to prevent feeding of more than one document at a time, and feed rolls for feeding the separated single document to the platen. Due to manufacturing tolerances in the document feeder, uneven wear characteristics of the various rolls employed, and the improbability of obtaining exact frictional characteristics of all the roll surfaces employed in the feed system, there is a high probability of a repetitive type skew being produced, resulting in the documents continuously being placed on the platen at a slight angle or skew. It is therefore the object of this invention to provide means for simply and effectively correcting repetitive skew encountered in a sheet feed path.

SUMMARY OF THE INVENTION

The subject invention relates to a sheet feeding apparatus employing a plurality of paired skew correction rollers, each pair of skew correction rollers comprising one roller formed of a substantially non-deformable material, the other roller of the pair being formed of a substantially deformable material, adjustment of the spacing between the two roll axes causing the deformable roller to deform against the substantially non-deformable roller to increase the length of the paper path through the roll pair and thereby cause the paper to be delivered from the skew correction rollers in a non-skewed condition.

DESCRIPTION OF THE PREFERRED EMBODIMENT

Figure 1:
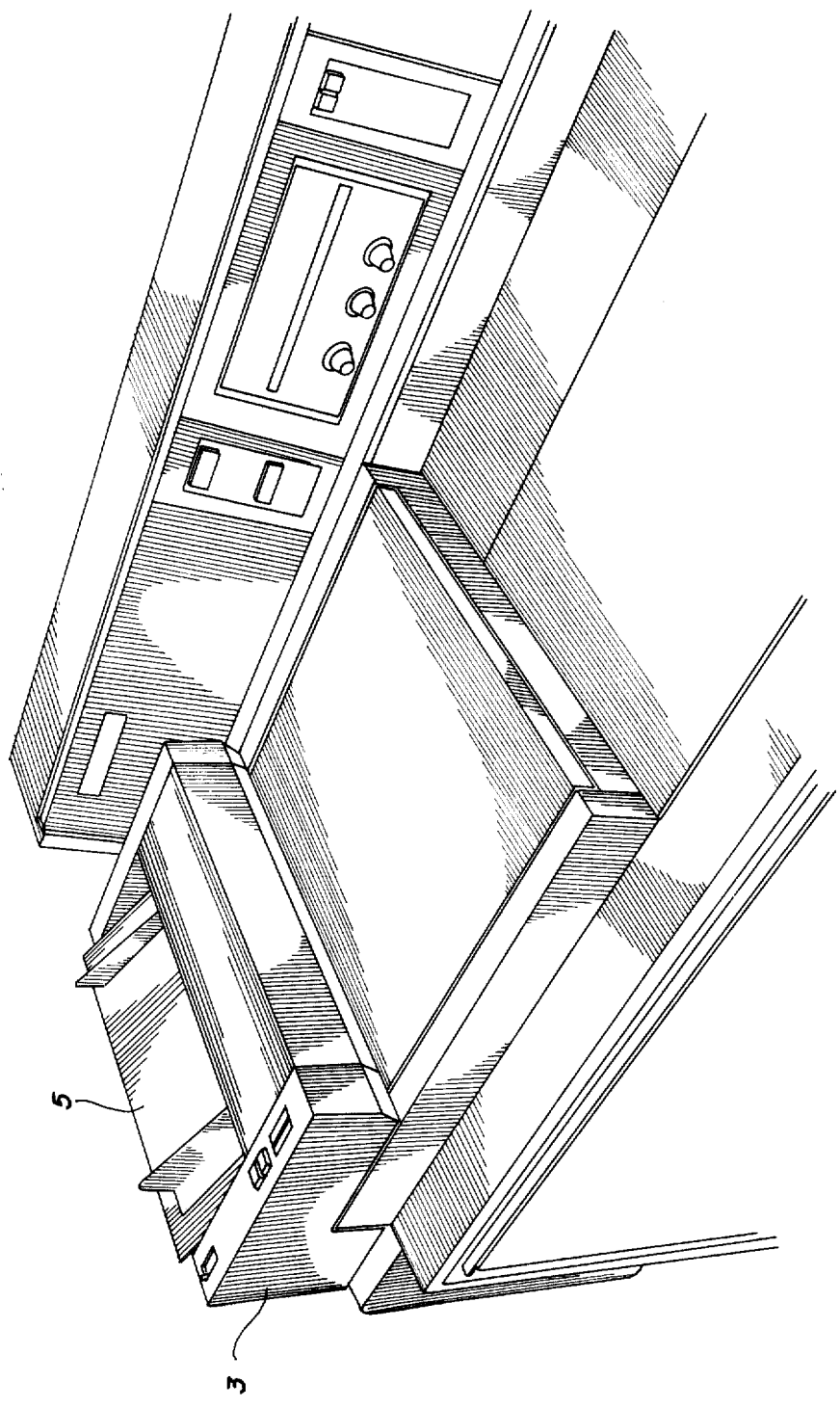
FIG. 1 is a perspective view of an automatic document feeder constructed in accordance with the instant invention operatively mounted on a continuous and automatic electrostatic reproduction machine.
Figure 2:
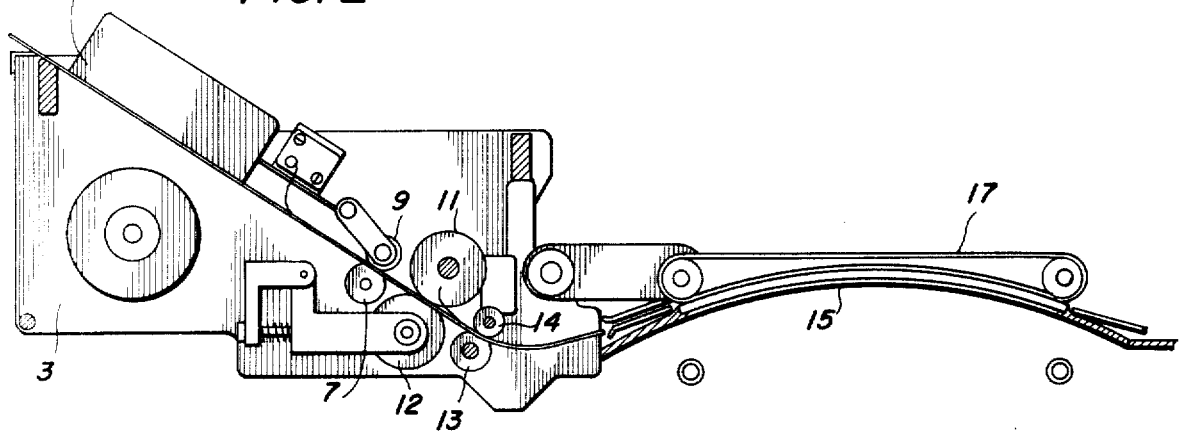
FIG. 2 is a schematic illustration of a preferred embodiment of the document feeding apparatus constructed in accordance with the invention in association with a reproduction machine.
Figure 3:
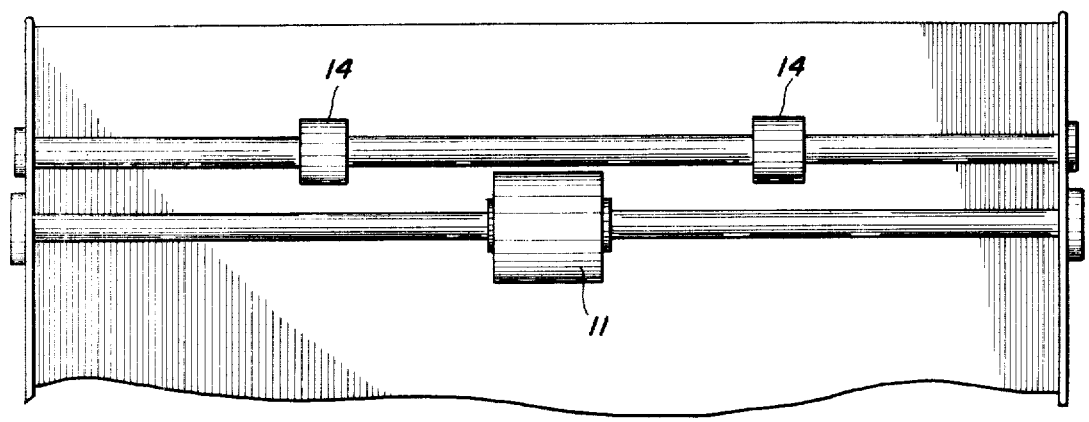
FIG. 3 is a top view of a portion of the automatic document feeder with portions taken away to illustrate the skew correction roll pairs.
Figure 4A:
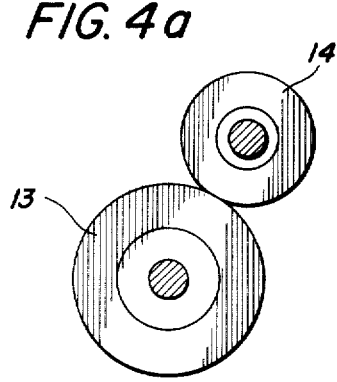
FIG. 4A illustrates a skew correction roll pair with minimal deformation of teh substantially deformable roller.
Figure 4B:
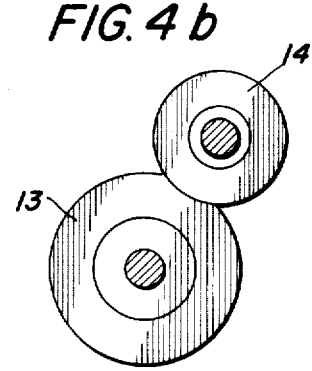
FIG. 4B illustrates a skew correction roll pair wherein the deformable roller is substantially deformed to increase the length of the paper path traversed by the document in passing therethrough.

Referring to FIG. 1 of the drawings there is shown a portion of an automatic electrostatic reproduction machine of the type disclosed in U.S. Pat. No. 3,301,126 to Osborne et al. An automatic document handler 3 is positioned thereon to automatically feed documents to be copied to the platen of the copy machine and remove the copied document therefrom. Documents to be copied are placed face down in tray 5, the first document to be copied being at the bottom of the stack. As shown in FIG. 2, the document to be fed is separated from the stack by an intermittently operated urging roller 7. A freely rotatable roller 9 is positioned above roller 7 to provide a slight downward pressure on the stack for improved frictional engagement between urging roll 7 and the bottom sheet of the stack. The sheet is forwarded by roll 7 to multiple sheet separating roll pair 11, 12 wherein multiple sheets are separated in a manner well known in the art, the bottom roll 12 being continuously rotated in a forward feed direction while the upper roll 11 is continuously urged in a reverse direction by means of a slip clutch arrangement. In the event that more than one sheet is presented between the roll pair 11, 12, the friction between the two sheets is less than the friction between the top sheet and the upper roll 11, thereby allowing upper roll 11 to rotate in the reverse direction to drive the upper sheet back toward the stack. In the event only one sheet is presented between the roll pair 11, 12, the friction between the sheet and the lower roll and between the upper roll and the sheet is sufficient to drive the upper roll 11 in the document feed direction, the slip clutch or other well known mechanism allowing the upper roll to rotate in the feed direction. The sheet next contacts a plurality of skew correction roll pairs 13, 14 wherein skew, which is inherent in the machine due to machine tolerance variations, uneven wear of the retard roll pair 11, 12 or the urging roll 7, is corrected to assure that the document is placed on the platen 15 of the copy machine in the proper position. Referring to FIGS. 3, 4A and 4B wherein the skew correction rollers are illustrated, it can be seen that the upper roll 14 is formed of a substantially non-deformable material while the lower roll 13 of each roll pair is formed of a deformable material. Initially, both roll pairs may be adjusted to provide for a certain spacing between the axes thereof for minimal or very slight deformation of the deformable roll. Upon operation of the device, if it appears that documents are consistently delivered to the platen belt 17 in a skewed condition, the roll pair 13, 14 on the side of the paper which is consistently leading during the feeding operation may be adjusted to deform the lower roll of the pair. Since the sheet must travel further when going through the roll pair having the greatest lower roll deformation since it must traverse a curved path rather than a straight path, that portion of the sheet will effectively be slowed down, or stated another way, the skew of the paper will be corrected such that the sheet is delivered to the platen belt 17 in the proper orientation. Thus, the skew correction roll pair 13, 14 can be used to effectively increase or decrease the length of travel of each edge of the document being fed to correct skew which may be present and provide optimum positioning of the document on the platen 15.

For a complete description of the operation of a document feeder similar to that disclosed herein, reference may be had to U.S. Pat. No. 3,674,363 to Bayler et al.

While the preferred embodiment of the instant invention has been described with reference to an automatic document handler, it should be understood that the inventive concept disclosed to prevent or correct skew may be employed in any sheet handling mechanism wherein repetitive skew is encountered. Thus, it should be understood that the invention is not limited to the preferred embodiment described but may be otherwise embodied within the scope of the following claims.

What is claimed is:

1. A sheet feeding apparatus adapted for sequentially receiving and forwarding single sheets being transported along a sheet path comprising:

a plurality of feed roll pairs disposed in the path of sheet travel for contact with the lead edge of the sheet at opposite sides thereof, each roll pair having a first roll formed of a substantialy non-deformable material, each of said roll pairs having a second roll formed of a deformable material, the rolls of each roll pair being adjustable relative to each other to vary the deformation of the deformable roll, thereby increasing the length of the sheet path therethrough to correct skew of the sheet passing therebetween.

2. An automatic document handler adapted for placing documents from a document stack onto a platen of an electrostatic reproduction machine and removing the document therefrom after the document has been copied including:

a frame member;

a document tray adapted to receive a stack of documents to be sequentially copied by the electrostatic reproduction machine;

an urging roller adapted to separate documents singly from the stack;

document retard means adapted to prevent feeding of multiple sheets that may be separated from the stack by the urging roller along with the desired document;

a plurality of feed roll pairs disposed in the path of document travel for contact with the lead edge of the document at opposite sides thereof, each roll pair having a first roll formed of a substantially non-deformable material, each of said roll pairs having a second roll formed of a deformable material, the rolls of each roll pair being adjustable relative to each other to vary the deformation of the deformable roll, thereby increasing the length of the document path therethrough to correct skew of the document passing therebetween; and, a platen belt adapted to receive the document from said feed roll pair for positioning the document on the platen of the copy machine.

3. An automatic document handler according to claim 2 wherein said tray is adapted to receive the documents face down, the first document in the document set being on the bottom of the stack, said urging roller being adapted to urge the bottom document of the stack toward said retard means.

4. A method of correcting skew in a sheet being forwarded along a sheet feed path wherein one side of the lead edge of the sheet is in advance of the other side of the lead edge of the sheet including the steps of passing the side of the sheet in advance of the other side of the sheet through a first path having a predetermined length; and, passing the other side of the sheet through a path having a predetermined length less than the predetermined length of said first path.

* * * * *